(12) United States Patent
Bergan et al.

(10) Patent No.: US 10,767,935 B2
(45) Date of Patent: Sep. 8, 2020

(54) HEAT EXCHANGER COMPRISING CONCRETE THERMAL ENERGY STORAGE ELEMENTS

(71) Applicant: EnergyNest AS, Billingstad (NO)

(72) Inventors: Pål G. Bergan, Nesøya (NO); Christopher Greiner, Vøyenenga (NO)

(73) Assignee: EnergyNest AS, Billingstad (NO)

( * ) Notice: Subject to any disclaimer, the term of this patent is extended or adjusted under 35 U.S.C. 154(b) by 0 days.

(21) Appl. No.: 15/536,566

(22) PCT Filed: Dec. 18, 2015

(86) PCT No.: PCT/NO2015/050253
§ 371 (c)(1),
(2) Date: Jun. 15, 2017

(87) PCT Pub. No.: WO2016/099290
PCT Pub. Date: Jun. 23, 2016

(65) Prior Publication Data
US 2017/0363368 A1 Dec. 21, 2017

(30) Foreign Application Priority Data
Dec. 19, 2014 (NO) .................................. 20141540

(51) Int. Cl.
*F28D 20/00* (2006.01)
*F01K 3/18* (2006.01)
(Continued)

(52) U.S. Cl.
CPC .......... *F28D 20/0056* (2013.01); *F01K 3/186* (2013.01); *F02C 3/305* (2013.01);
(Continued)

(58) Field of Classification Search
CPC ............... F28D 20/0056; F28D 20/028; F28D 2020/0047; F28D 2020/0065;
(Continued)

(56) References Cited

U.S. PATENT DOCUMENTS

| | | | |
|---|---|---|---|
| 3,302,407 A | 2/1967 | Every | |
| 3,381,113 A * | 4/1968 | Jacques | ................. F24H 7/0433 |
| | | | 122/35 |

(Continued)

FOREIGN PATENT DOCUMENTS

| | | |
|---|---|---|
| DE | 10211598 A1 | 9/2002 |
| DE | 10350879 A1 | 1/2005 |

(Continued)

OTHER PUBLICATIONS

U.S. Appl. No. 15/536,585.
(Continued)

*Primary Examiner* — Travis C Ruby
(74) *Attorney, Agent, or Firm* — Shackelford, Bowen, McKinley & Norton, LLP

(57) ABSTRACT

A thermal energy storage and heat exchanger includes a plurality of concrete thermal energy storage elements, a housing into which the plurality of concrete thermal energy storage elements are arranged, a heat transfer and storage medium in a volume between the plurality of concrete thermal energy storage elements and the housing, in a form of a stagnant medium or a dynamic medium. The thermal energy storage and heat exchanger further includes at least one inlet for delivery of thermal energy to the thermal energy storage, at least one outlet for taking out thermal energy from the thermal energy storage, and thermal insulation arranged into or on an inside or outside of walls, floor and roof of the housing.

11 Claims, 15 Drawing Sheets

(51) Int. Cl.
*F02C 3/30* (2006.01)
*F28D 20/02* (2006.01)

(52) U.S. Cl.
CPC .... *F28D 20/028* (2013.01); *F28D 2020/0047* (2013.01); *F28D 2020/0065* (2013.01); *F28D 2020/0078* (2013.01); *F28F 2270/00* (2013.01); *F28F 2270/02* (2013.01); *Y02E 60/142* (2013.01)

(58) Field of Classification Search
CPC ..... F28D 2020/0078; F28D 2020/0013; F28D 2020/006; F01K 3/186; F28F 2270/02; F02C 3/305
See application file for complete search history.

(56) References Cited

U.S. PATENT DOCUMENTS

| | | | |
|---|---|---|---|
| 3,624,356 A | 11/1971 | Havill | |
| 4,010,731 A * | 3/1977 | Harrison | F28D 20/0043 126/620 |
| 4,085,333 A | 4/1978 | Grise et al. | |
| 4,194,496 A * | 3/1980 | Carlson | F24D 11/007 126/400 |
| 4,203,489 A * | 5/1980 | Swiadek | F28D 20/0034 126/400 |
| 4,205,656 A * | 6/1980 | Scarlata | F28D 20/0034 126/263.01 |
| 4,219,074 A * | 8/1980 | Hansen | F28D 20/0052 165/45 |
| 4,323,113 A * | 4/1982 | Troyer | F24D 11/006 165/45 |
| 4,395,620 A * | 7/1983 | Clyde | F24H 7/0416 338/302 |
| 4,397,152 A * | 8/1983 | Smith | F03G 6/065 60/641.15 |
| 4,405,010 A * | 9/1983 | Schwartz | F28D 20/0056 165/10 |
| 4,412,426 A | 11/1983 | Yuan | |
| 4,442,826 A | 4/1984 | Pleasants | |
| 4,452,229 A | 6/1984 | Powers | |
| 4,520,862 A * | 6/1985 | Helmbold | F28D 20/0056 165/10 |
| 4,524,756 A | 6/1985 | Laverman | |
| 5,623,986 A | 4/1997 | Wiggs | |
| 5,694,515 A | 12/1997 | Goswami et al. | |
| 5,816,314 A | 10/1998 | Wiggs et al. | |
| 5,833,394 A | 11/1998 | McCavour | |
| 6,789,608 B1 * | 9/2004 | Wiggs | F28D 20/0052 165/45 |
| 2002/0053418 A1 * | 5/2002 | Hirano | F28D 20/0056 165/10 |
| 2004/0011395 A1 * | 1/2004 | Nicoletti | F28D 20/0034 136/246 |
| 2008/0016866 A1 * | 1/2008 | Mohr | F28D 20/0056 60/649 |
| 2008/0219651 A1 | 9/2008 | Nayef | |
| 2010/0199975 A1 * | 8/2010 | Bailey | F24D 3/105 126/617 |
| 2011/0017196 A1 * | 1/2011 | Bell | F24D 11/003 126/400 |
| 2011/0100586 A1 | 5/2011 | Yang | |
| 2011/0100587 A1 | 5/2011 | Yang | |
| 2011/0226440 A1 * | 9/2011 | Bissell | F28D 20/0039 165/10 |
| 2011/0247354 A1 * | 10/2011 | Asai | F24F 5/0046 62/324.6 |
| 2011/0272319 A1 | 11/2011 | Koivuluoma et al. | |
| 2011/0277470 A1 | 11/2011 | Benyaminy et al. | |
| 2011/0286724 A1 * | 11/2011 | Goodman | F24H 7/0466 392/346 |
| 2012/0055661 A1 * | 3/2012 | Feher | F28D 20/02 165/181 |
| 2012/0285442 A1 * | 11/2012 | Hung | F28D 20/0056 126/620 |
| 2013/0111904 A1 * | 5/2013 | Stiesdal | F02C 6/14 60/659 |
| 2013/0153169 A1 * | 6/2013 | Perryman | F28D 20/021 165/10 |
| 2014/0284021 A1 | 9/2014 | Laurberg et al. | |
| 2016/0320145 A1 | 11/2016 | Bergan et al. | |
| 2018/0003445 A1 | 1/2018 | Bergan et al. | |

FOREIGN PATENT DOCUMENTS

| | | |
|---|---|---|
| DE | 102009036550 A1 | 5/2010 |
| DE | 102011085722 A1 | 5/2013 |
| EP | 0941759 A1 | 9/1999 |
| EP | 2525051 A1 | 11/2012 |
| GB | 2049921 A | 12/1980 |
| GB | 2489011 A | 9/2012 |
| JP | S58-156151 A | 9/1983 |
| JP | 2000-161882 A | 6/2000 |
| JP | 2004-309124 A | 11/2004 |
| JP | 2008-281320 A | 11/2008 |
| JP | 2014-520243 A | 8/2014 |
| NO | 20141540 A1 | 6/2016 |
| WO | WO-9747825 A1 | 12/1997 |
| WO | WO-2006046874 A1 | 5/2006 |
| WO | WO-2008106700 A1 | 9/2008 |
| WO | WO-2010060524 A1 | 6/2010 |
| WO | WO-2012169900 A1 | 12/2012 |
| WO | WO-2014003577 A1 | 1/2014 |
| WO | WO-2014044254 A2 | 3/2014 |
| WO | WO-2015093980 A1 | 6/2015 |
| WO | WO-2016099289 A1 | 6/2016 |

OTHER PUBLICATIONS

Bråten, Knut, "International Search Report," prepared for PCT/NO2015/050253, dated Mar. 14, 2016, three pages.
Bozis, D. et al., "On the Evaluation of Design Parameters Effects on the Heat Transfer Efficiency of Energy Piles," Energy and Buildings 43, Dec. 28, 2010, pp. 1020-1029.
Laing, D. et al., "Thermal Energy Storage for Direct Steam Generation," Solar Energy 85, Oct. 20, 2010, pp. 627-633.
CETCO Drilling Products, Grouts & Sealants Technical Data, "Geothermal Grout / Enhanced Thermally Conductive Grout", Rev. Jan. 2009.

\* cited by examiner

Cylindrical tank configuration with radial flow

Alternative element arrangements

Circular aligned

Circular staggered

Hexagonal

Some cross-section alternatives

- 5b and 5c are clearly best for flow and heat transfer performance
- 5c is better than 5b, but is somewhat more complex to produce
- 5c has better volume efficiency than 5b and 5a, see next slide

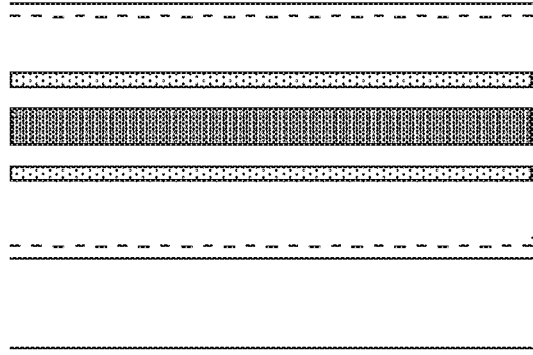
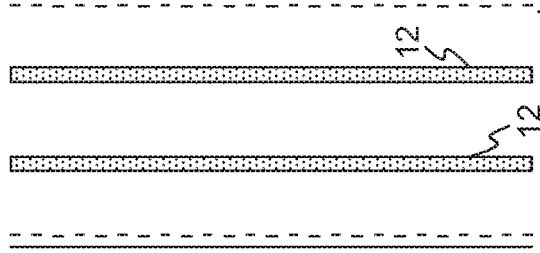
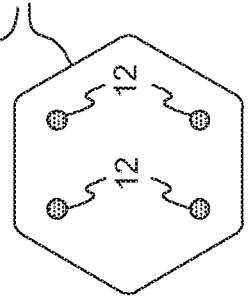
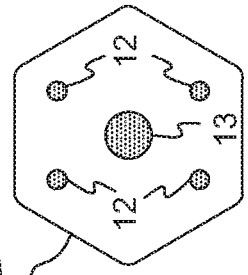
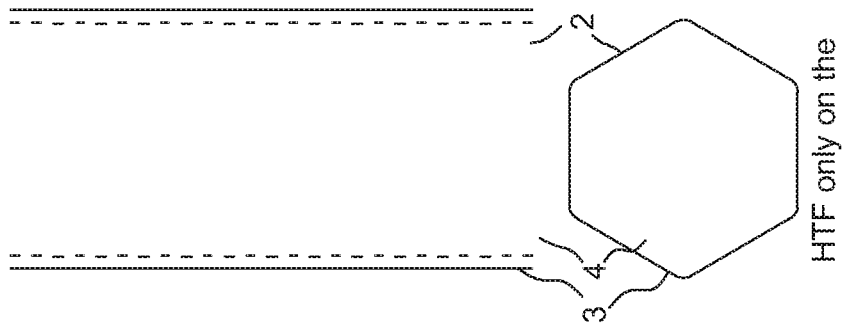

(Hybrid) Phase Change Material (PCM) storage!

(Hybrid) Phase Change Material (PCM) storage!

High temperature design such as molten salt and very high temperature salt

HEAT EXCHANGER COMPRISING CONCRETE THERMAL ENERGY STORAGE ELEMENTS

FIELD OF THE INVENTION

The present invention relates to thermal energy storages and heat exchangers. More specifically, the invention relates to a thermal energy storage feasible for storage and heat exchange at high temperature, suitable for effective conversion of thermal energy into electricity as well as for other types of applications of the stored energy.

BACKGROUND OF THE INVENTION AND PRIOR ART

Cost effective energy storage, suitable for storing energy from new as well as traditional energy sources and delivering the energy when needed, is clearly a "missing link" for more efficient exploitation of new and existing energy sources.

Storage of energy allows for better match between when energy is produced and when it needs to be used; in short this means the ability to "time shift" energy delivery. This is particularly important for facilitating higher penetration of renewable energy. Typically there is no delivery of wind energy when the wind does not blow and there is no solar energy available when the sun has gone down. Beyond this, traditional power units such as coal fired and nuclear power plants operate most efficiently with a constant power production whereas the market demands typically varies strongly through a 24 hour day cycle. Moreover, by placing storage near to where power is used implies that the main electric grid may be utilized more efficiently and limitations by bottlenecks in transmission can be overcome. Large scale and "grid scale" energy storage is clearly a key component in an environmentally friendly, efficient future power system making the most out of renewable and other energy sources.

In patent publication WO 2012/169900 A1, a Thermal Energy Storage (TES) is described, having beneficial properties over prior art storages. More specifically, a practical and cost effective solution is provided for a thermal storage using solid-state material as the main storage medium, allowing for storage of energy in the form of high temperature heat, which means thermal energy at sufficiently steam turbine-generator set or equivalent means.

In international patent application PCT/NO2013/050120, it is described how thermal energy storages like those according to the teaching of WO 2012/169900 A1 are beneficial in order to simplify and increase efficiency of energy plants of various types, such as for concentrated solar power plants and nuclear power plants.

Despite the significant steps forward, provided by the technology described above, there is still a need for further improvements. The effect/cost ratio is always in demand for improvement, as well as the versatility and flexibility of the thermal energy storage with respect to sources of energy. Further, providing better reliability of delivery from renewable energy sources such as sun and wind is clearly another goal. The objective of the present invention is to meet growing needs and demands with new technology.

SUMMARY OF THE INVENTION

The invention provides a thermal energy storage and heat exchanger, distinctive in that it comprises:

- a number of hardened concrete thermal energy storage elements;
- a housing, into which said elements have been arranged;
- an active heat transfer and storage medium in the volume between said elements and said housing, in the form of either: a stagnant liquid or phase change material, or a dynamic fluid arranged to flow in the volume between said elements and said housing;
- at least one means for delivery of thermal energy to the thermal energy storage;
- at least one means for taking out thermal energy from the thermal energy storage; and
- thermal insulation.

In a first main embodiment, the thermal energy storage and heat exchanger of the invention comprises a dynamic fluid, such as thermal oils, heated air, exhaust gas, flue gas, combustion gas, inert gas, other gas, molten salts and molten metals, as active heat transfer and storage medium in the volume between said elements and said housing; at least one inlet for said dynamic fluid to the housing; and at least one outlet for said dynamic fluid from the housing. The term dynamic fluid means that said fluid flows in normal operation, for enhanced rate of input or output of thermal energy, as well as enhanced storage of thermal energy compared to no active fluid in the volume between the elements and the housing. Said flow is due to one or more of the features: a compressor, a pump, inherent pressure in the fluid as delivered by the source, and gravity. The elements should be arranged with sufficient distance for flow around and between the elements to facilitate desired convection and allow for through circulation in connection with desired flow between external inlet and outlet from the storage housing.

In a second main embodiment, the thermal energy storage and heat exchanger of the invention comprises a stagnant liquid such as thermal oils, molten salts and molten metals, or phase change material that can be both solid or liquid, or liquid or gaseous, as active heat transfer and/or storage medium in the volume between said elements and housing; and a heat exchanger embedded in some or all of the thermal energy storage elements as means for taking thermal energy in or out from the storage. The term stagnant fluid means that said fluid is still, without any significant flow except of possible natural convection in normal operation, but providing enhanced storage of thermal energy compared to no active liquid or phase change material in the volume between the elements and the housing.

In prior art storages, as mentioned in the introduction, insulation, such as perlite, or air, was arranged in between the thermal storage elements inside the housing of the storage. Said volume had in principle no active function for thermal energy input or output or thermal energy storage or delivery capacity, The thermal energy storage and heat exchanger of the invention comprises thermal energy storage elements of a size and weight easy to handle with a building site crane, the number of elements in a storage is 2, 5, 10, 40, 100, 200 or 500 and above, and any integer in between. Accordingly, said number can range from less than 10 to several 10's of thousands or more, depending on the size of each element and its respective energy storage capacity, and the desired energy storage capacity of the whole storage system. The elements are arranged vertically standing, side-by-side, as one or more groups of elements in a thermal storage, or horizontally laying and stacked as one or more groups of stacks of elements in a thermal storage; the elements are arranged in a fixture or template or with intermediate inlays for stacking, or the elements are arranged closely stacked or packed.

Preferable for most embodiments, the hardened concrete thermal energy storage elements comprises an outer metal shell or woven fibre shell being a combined casting form, reinforcement and protective shell, the concrete has been cast and cured (hardened) into said outer shell. The storage operation temperature shall not exceed the maximum operation temperature for the chosen metal, alloy or woven fiber material of the outer shell, which material preferably is steel or steel alloy. The outer shell of the element has a cross section shape which is circular, hexagonal, quadratic, rectangular, rectangular with rounded corners or half-circle short sides, or polygonal, most preferably the element has circular cross section shape, wherein the outer shell is corrugated, with regular corrugations or with bucked surface of the Spiro-pipe type, or the outer metal shell is smooth and even.

Preferably said outer metal shell is open in one end, into which open end the unhardened concrete has been poured and cast, optionally the open end has been closed with a metal shell lid after casting.

Preferably, the hardened concrete thermal energy storage elements comprises U-shaped small diameter pipe heat exchangers, for heat input and output, and and electric heater extending out from one end of the thermal energy storage elements, the heat exchangers have been dimensioned to provide turbulent fluid flow at normal operating conditions.

The thermal energy storage and heat exchanger of the invention preferably comprises an opening or an outlet at a low elevation of the housing, as an outlet and draining opening for dynamic active heat transfer and storage fluid or as an outlet for draining of a stagnant liquid or phase change material.

The thermal energy storage and heat exchanger of the invention preferably comprises an opening or an inlet at a high elevation of the storage, as an inlet for dynamic active heat transfer and storage fluid, said inlet comprising a pump, fan or compressor operatively connected for flow of dynamic fluid, or as an opening for filling a stagnant liquid or phase change material. Preferably, the storage also comprises an opening at a low elevation of the storage, preferably with a pump, fan or compressor operatively connected, and which opening is inlet and outlet is interchangeable.

In a preferable embodiment, the thermal energy storage according to the invention comprises a dynamic active heat transfer and storage fluid in the form of heated air or other gas, combustion gas, exhaust gas or similar, an inlet and an outlet for said gas, concrete thermal energy storage elements arranged closely but with cross section area for flow around and between the elements at least as large as the cross section area for flow of the inlet to and the outlet from the storage housing, embedded heat exchangers in said elements, the embedded heat exchangers having thermal insulation on pipes or connections extending outside said elements, which embodiment is operable for inlet gas temperatures up to 1000-1500° C.

The invention also provides use of the thermal energy storage according to the invention, for storage of energy and delivery of thermal energy.

Said use is preferably for operating temperatures up to 1500° C. for thermal storages with elements without an outer metal shell but optionally with woven fibre shell and with insulated connectors to imbedded heat exchangers, for operating temperatures up to 570-700° C. for thermal storages with elements with an outer metal shell, preferably the delivery temperature of thermal energy from the storage is as high as possible while still feasible for an electric turbine-generator or similar, for effective conversion to electricity.

The solid state thermal storage material in the elements is preferably a special grade concrete that has been cast and hardened, preferably into the outer shell for embodiments with an outer shell, the shell being the only reinforcement and acts as a casting form and a life-prolonging protection of the elements against long term effects of thermal fluctuations and chemical effects of the medium in between the elements and the housing. The term concrete has the broadest meaning; any curable mixture of aggregate and cement or binder, including curable refractory mixtures. Geomaterials that have been sintered also fall into this category. The concrete may also be fibre-reinforced. Preferably, the outer shell is a steel shell made of rolled bands of steel joined by folding, welding or brazing or by other method, functioning as ring reinforcement and casting form. A "Spiro" type pipe section, with a joined end cap and optionally a top cap, is a preferable embodiment of an outer steel shell. Machines for rolling and joining steel bands into Spiro-type pipe sections, are available from commercial suppliers. Commercial suppliers sell feasible pipes or pipe sections for ventilation, discharge, sewage or other use. Alternatively the outer shell may be a thin walled pipe that being fully seamless or longitudinally or spirally welded.

Alternatively, to having round cross section, the elements and outer shells have hexagonal cross section shape or other cross section shape, such as quadratic or rectangular, allowing closer packing and larger solid/volume ratio inside the flow more evenly, provides a uniform distance between elements, providing better heat transfer in the external medium, and allows closer packing and higher solid/volume ratio inside the housing, all of which will be beneficial for most situations. A steel shell or pipe section with end cap will typically be feasible as a casting form, for elements of up to about 12 m height and 0.5 m diameter, if the wall thickness is 0.5 mm or larger. Other materials, such as alloyed steel, aluminium or high temperature resistant alloys and chemically stable composites, such as carbon-based composites, are feasible as shell material.

In a preferable embodiment, the surface of the elements is corrugated or has fins; the elements are arranged closely side-by-side vertically standing or horizontally laying. The corrugations are preferably circular or helical in shape along the length of the elements. A circular corrugation describes a circle around the element; a helical corrugation describes a helix around and along the element. Alternatively, there may be longitudinal fins that are extruded, welded, or attached by other means to the shell surface. Corrugated or finned outer element shell surface allows better heat transfer due to increased surface area, for some embodiments. Closer element packing can be attained by arranging the corrugations to be "out of phase" or offset in relation to neighbouring elements. Accordingly, elements with corrugated shell with uneven surface are preferably arranged closely side by side in the housing. Bending or rolling plates, using equipment adapted for the purpose, with seam welding or folding, can be used to produce the corrugated or non-corrugated shells. Pressing round pipe sections into a hexagonal shape is a favourable production method.

The feasible dynamic operational temperature range of the storage is almost without limits, the limits are given by the materials used for construction and properties of fluids used. A typical temperature range is 50-750° C., more typically 120-570° C. whereas bounds may be more directly related to properties of materials used such as 250-570° C. (for salts) or 150-420° C. (for thermal oils). The highest temperatures are achieved with metal (lead or zinc, for example) or solidify in the temperature range, providing increased heat capacity (latent heat) associated with the phase change normally without causing undue stress on the housing and elements since the volume shrinks upon solidification. The most typical salts are nitrates, such as sodium-, potassium- and calcium nitrate and salt hydrates. Materials that store latent heat through phase change from solid to liquid, or from liquid to gas, and vice versa, are commonly referred to as Phase Change Materials (PCM). The thermal energy storage may preferably also comprise electrical heating elements arranged in the medium between said elements and housing, particularly if said medium is a PCM.

The term small diameter pipes for heat exchangers within the storage elements refer to not only the diameter for flow but also the type of flow, which shall be turbulent to obtain best possible heat transfer. For example, the small diameter pipe heat exchanger has flow cross section area to provide turbulent flow at normal operating conditions, which is Re>4000, more preferably Re>5000, where Re is the Reynold's number. For other cross section shapes, the Re at normal operating conditions should accordingly also be in the range for turbulent flow, since turbulent flow in the heat exchanger improves the heat exchange.

For lower temperature service, with less temperature-induced effects, other materials and cross section shapes other than round for pipes and shells become more feasible. The heat exchangers can be plate type exchangers if the operating temperature, or more specifically the dynamic temperature range and the solid state material, allows, which means that the temperature induced cracking is low or non-existent. Alternatively, the elements can be as described in the Applicant's WO 2012/169900 A1.

In a preferable embodiment of the storage of the invention, with heat exchangers embedded in the thermal elements and phase change material PCM arranged in the volume between the thermal elements, and also a method for operation of the storage; when taking out thermal energy of the storage, water is circulated through the heat exchangers such that the PCM solidifies used as heat of evaporation of the water.

FIGURES

The invention is illustrated with 18 Figures, of which:

Figure 4:
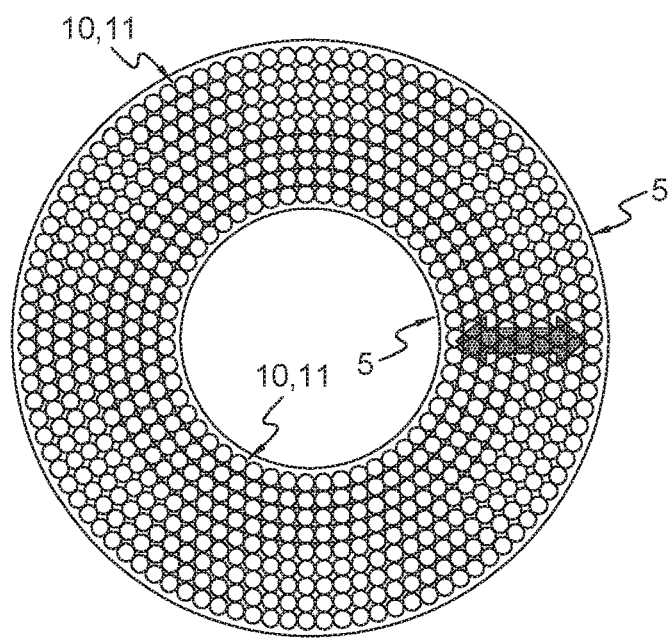
Figure 5A:
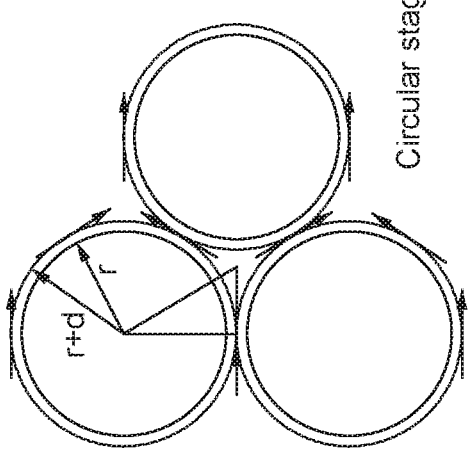
Figure 5B:
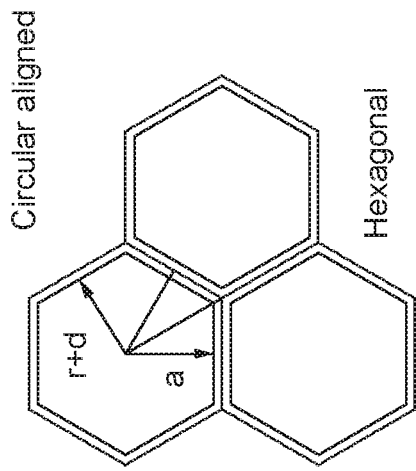
Figure 5C:
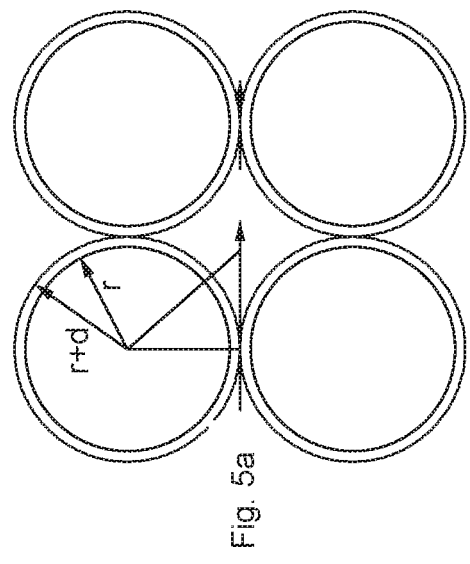
Figure 5D:
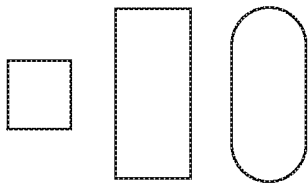
Figure 6:
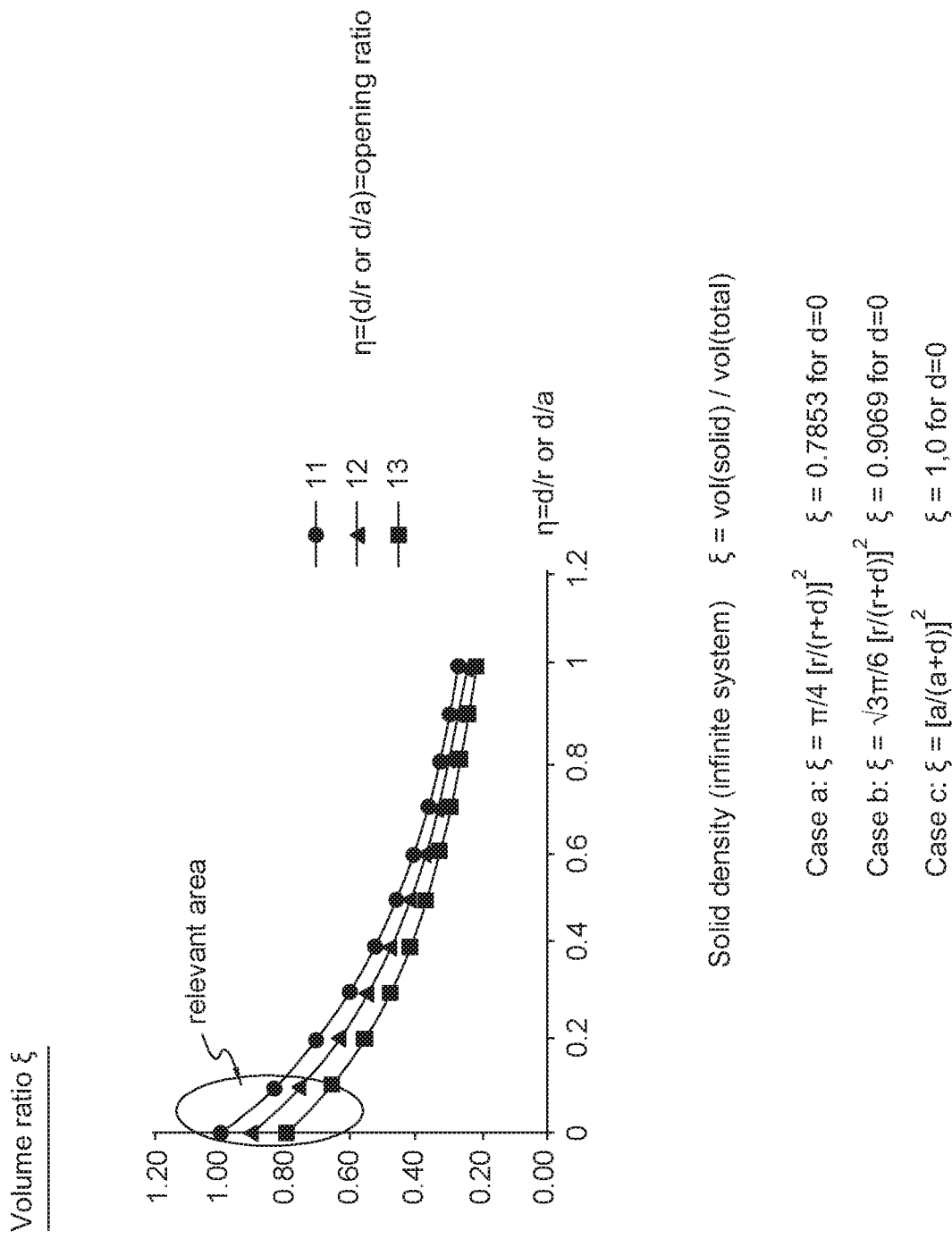
Figure 8:
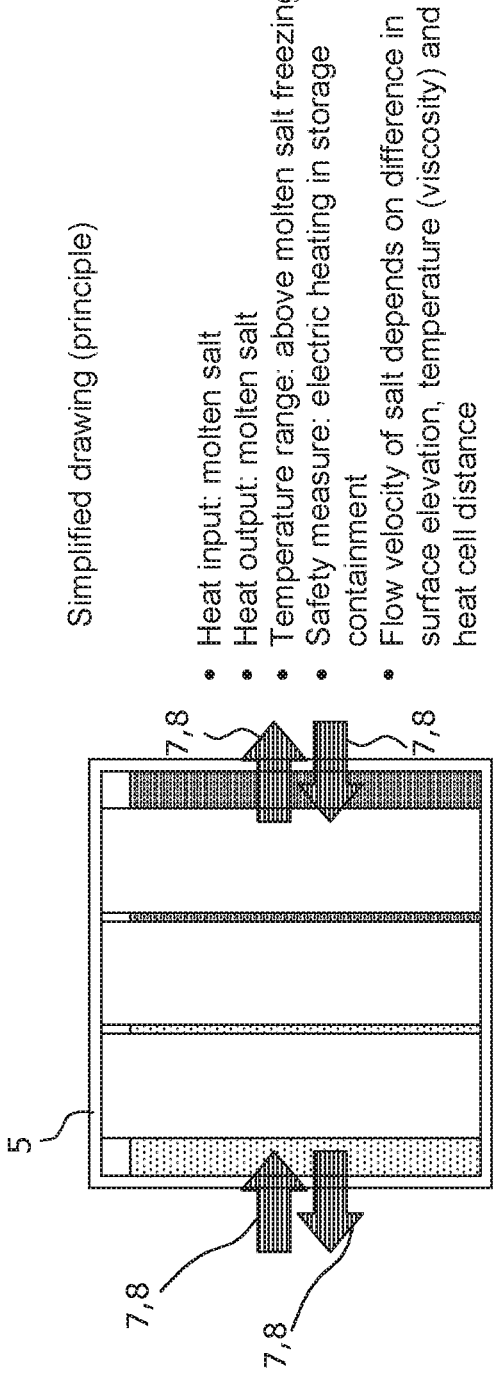
Figure 9:
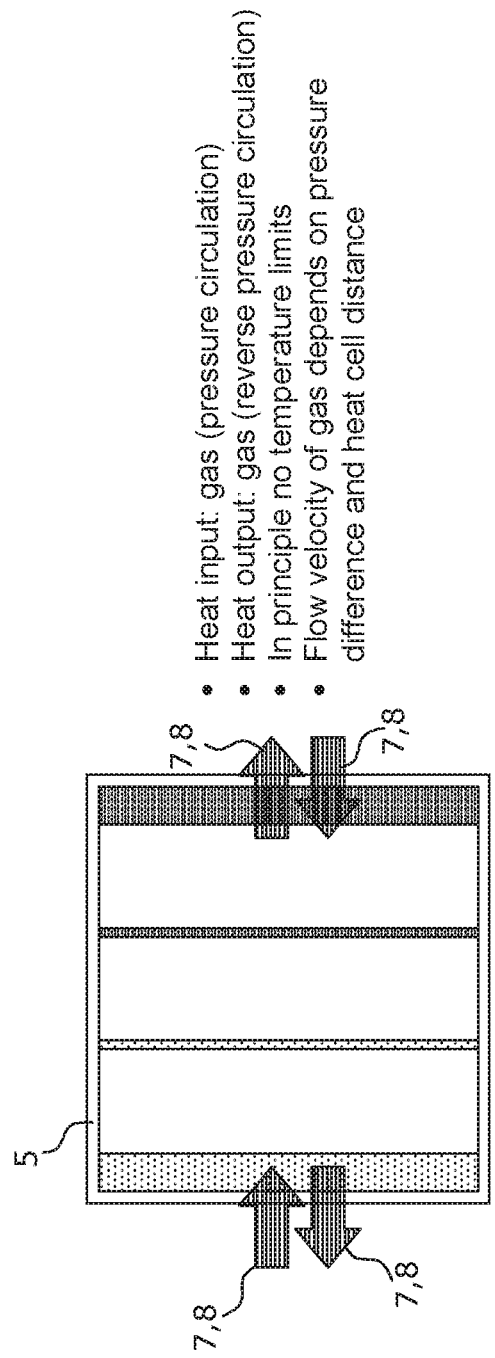
Figure 10:
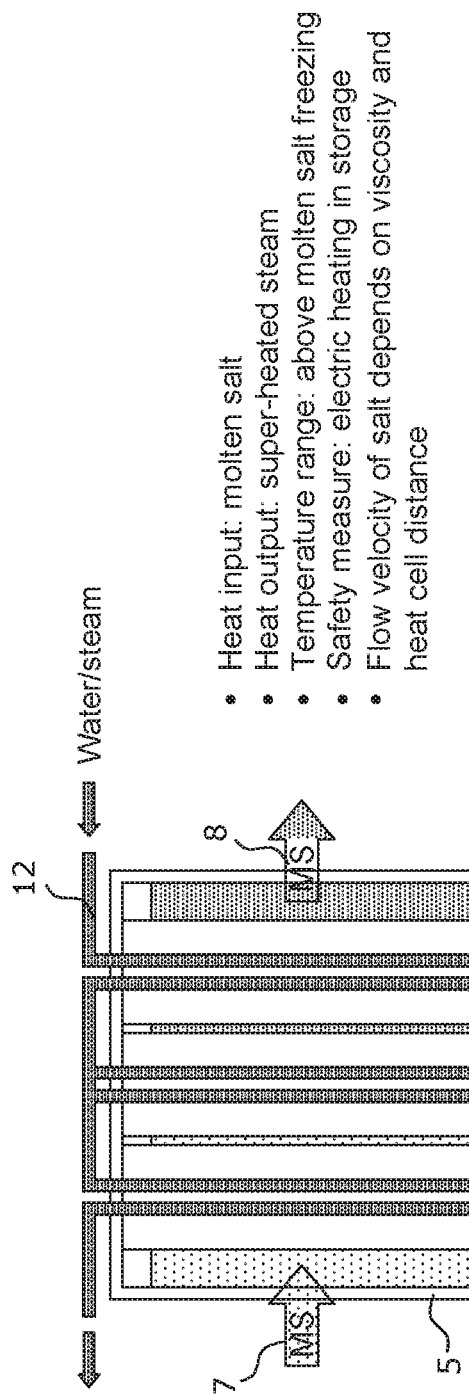
Figure 11:
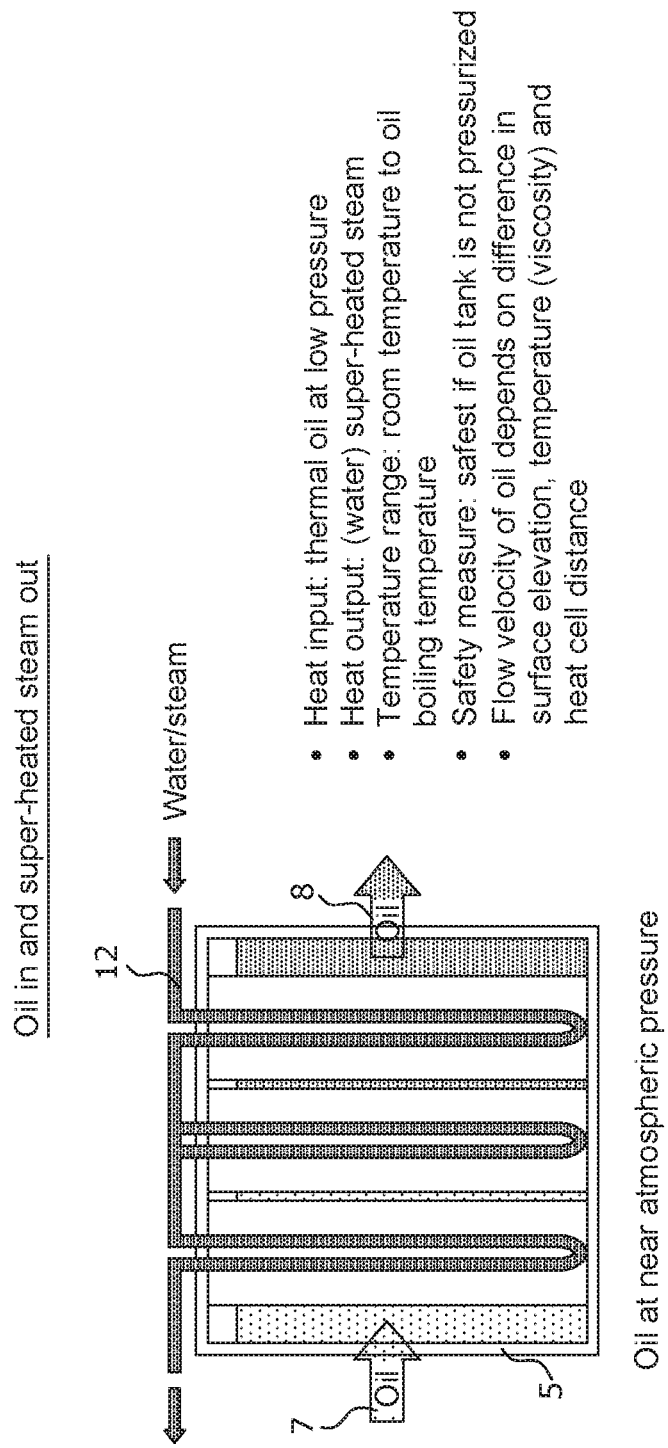
Figure 12:
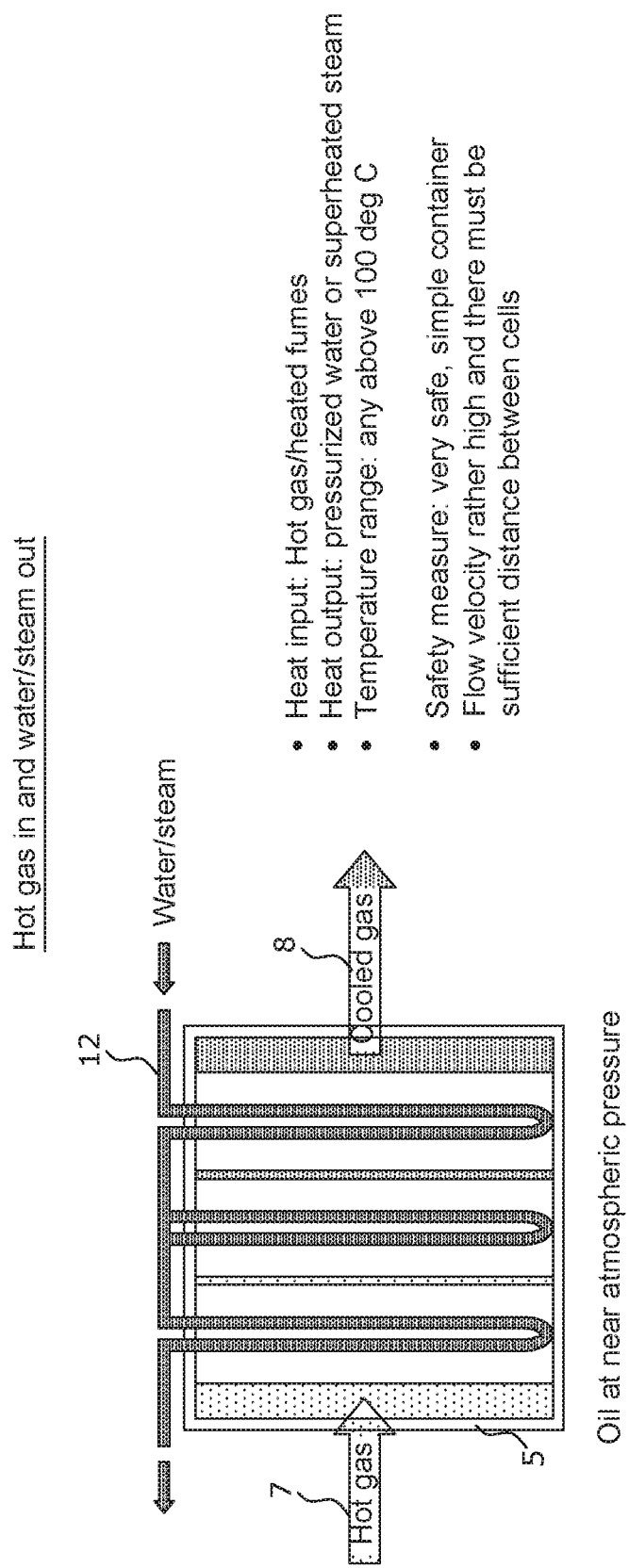
Figure 13:
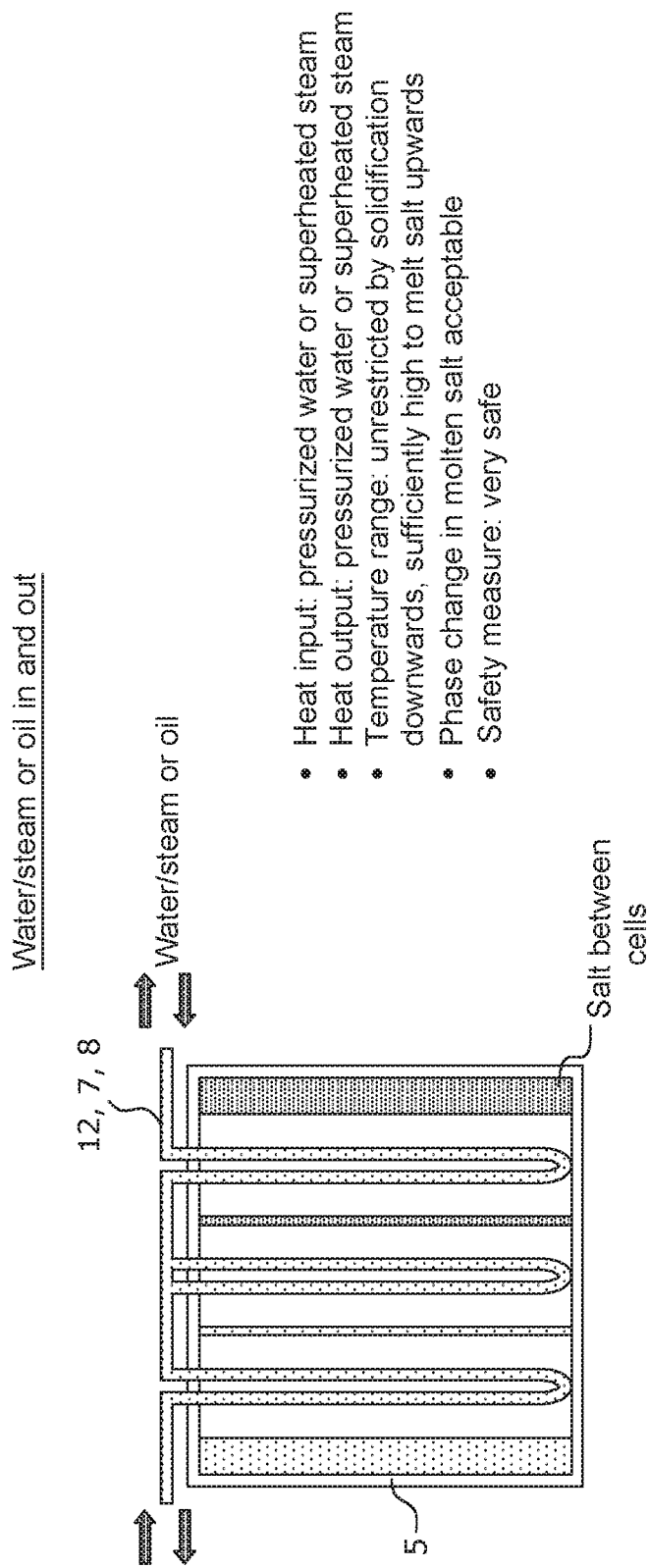
Figure 14:
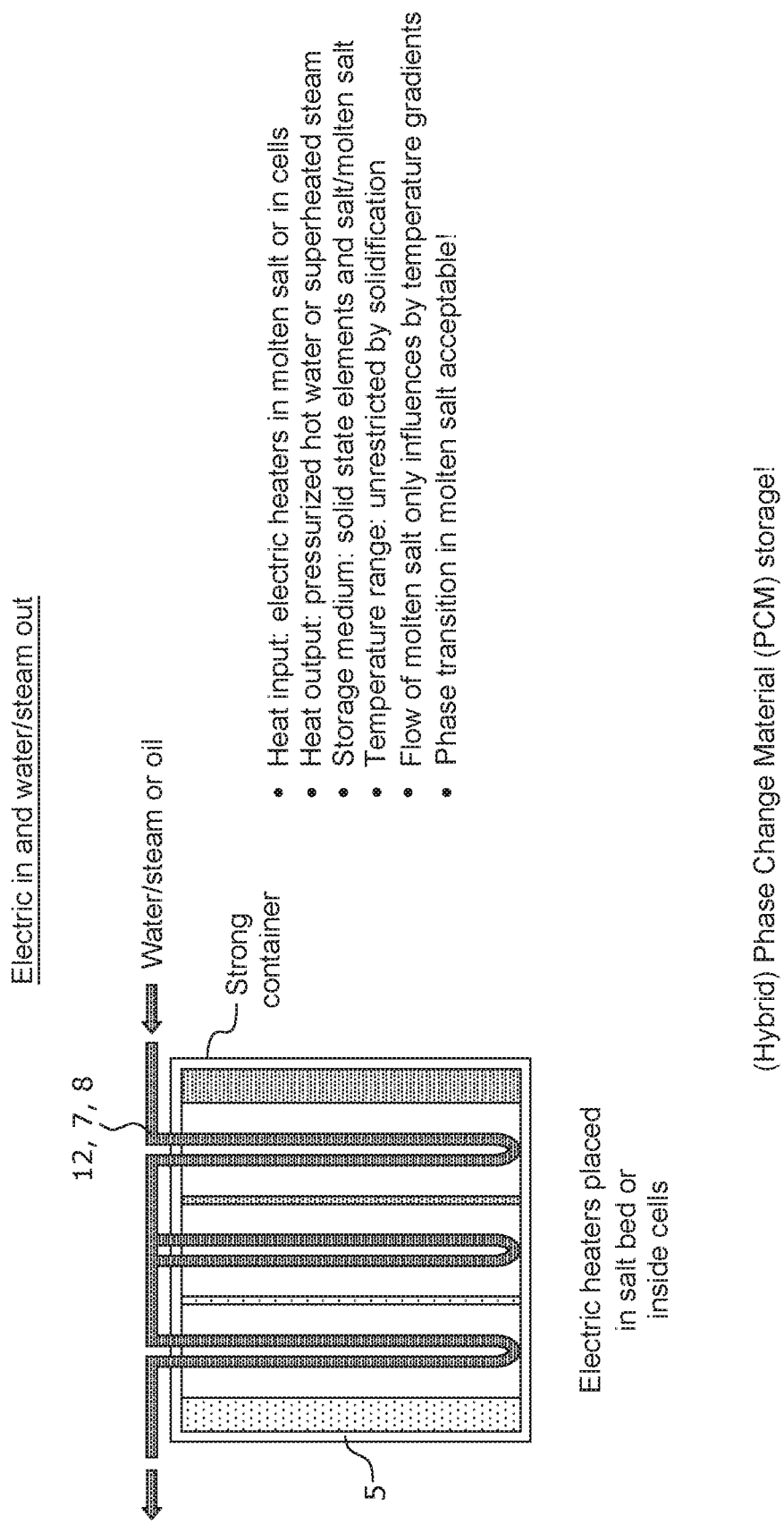
Figure 15:
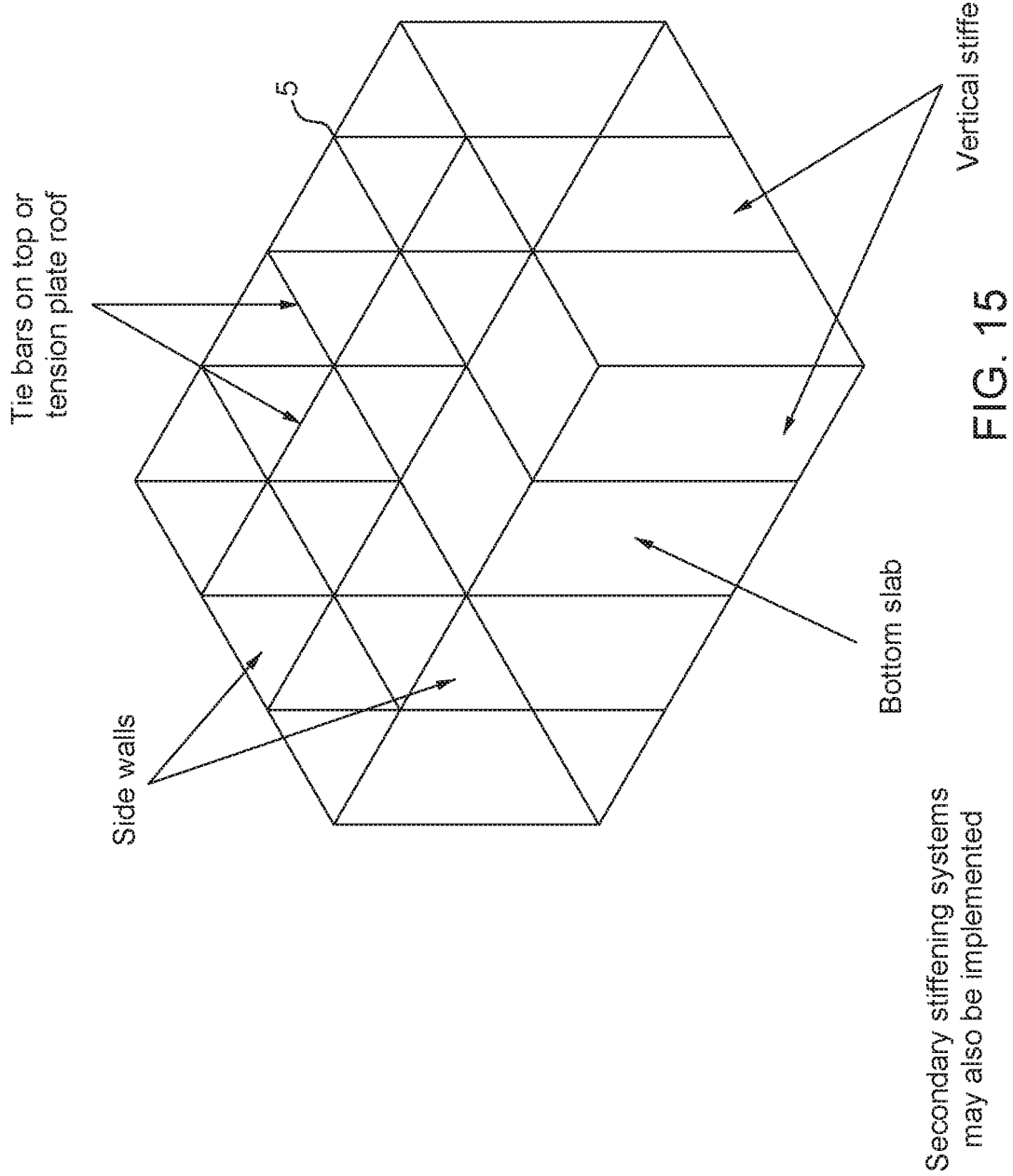
Figure 16:
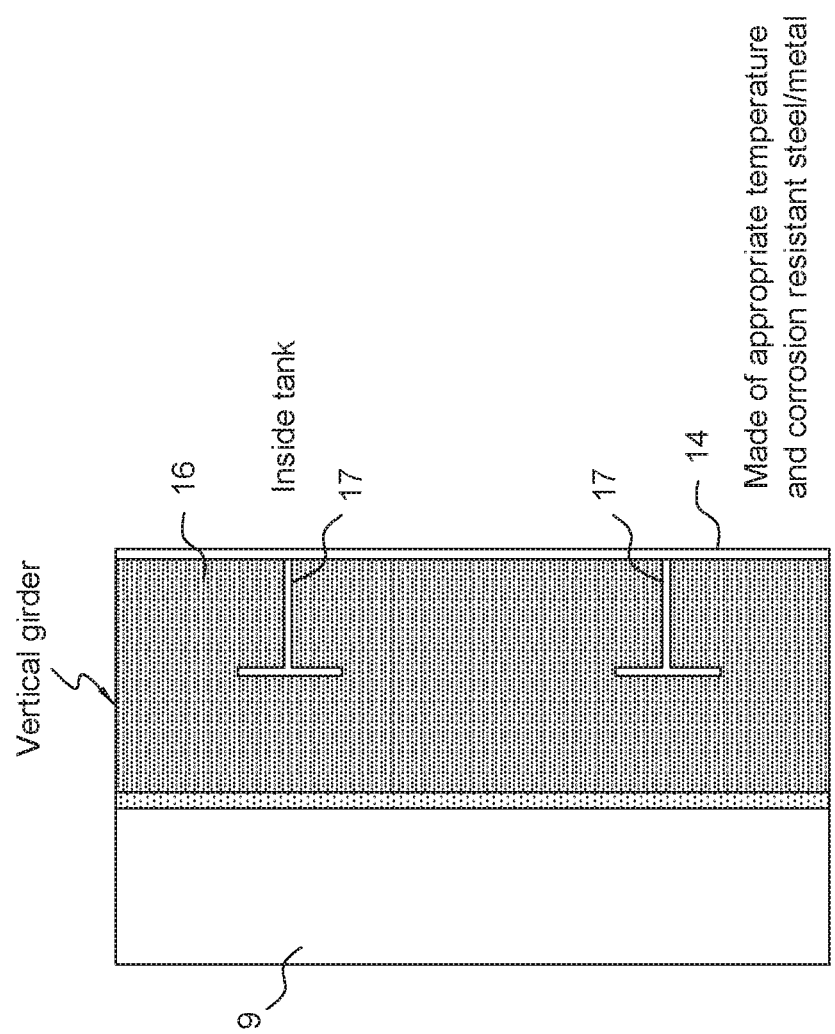
Figure 17:
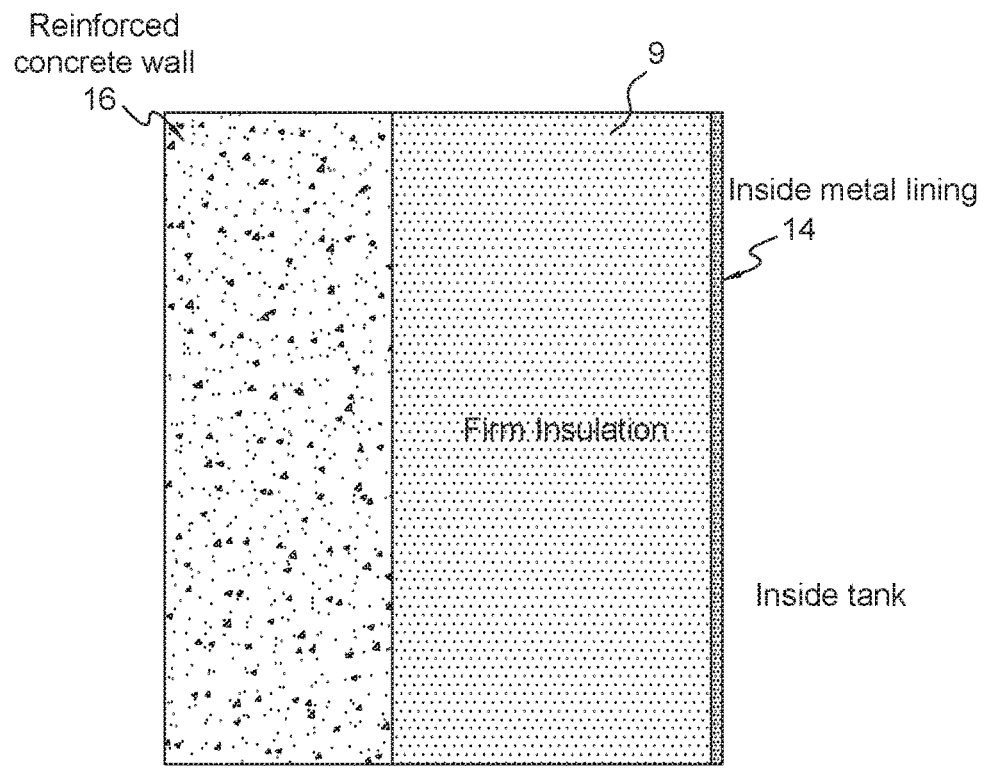
Figure 18:
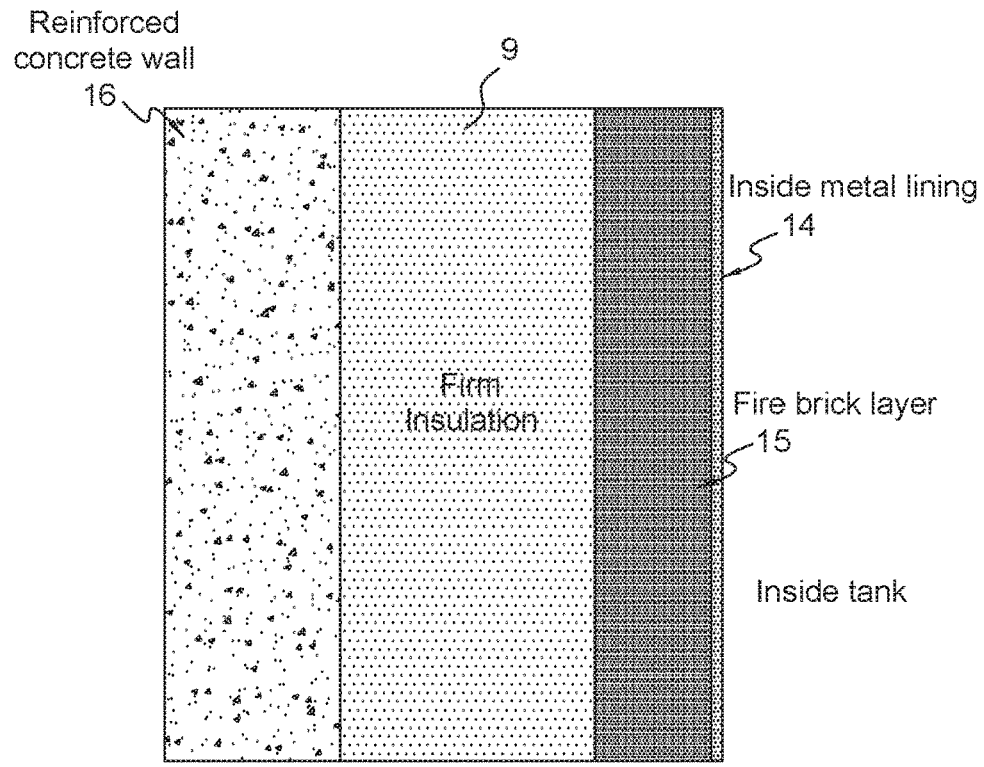

FIG. 4 is a simplified top view cross section of a storage of the invention with dynamic heat transfer fluid and circular elements inside a cylindrical ring shaped housing, FIGS. 5(a)-(d) and 6 illustrate different element arrangements and corresponding element volume ratios inside the housing, FIGS. 7(a)-(c) illustrate illustrates elements in longitudinal and in cross-sectional view, with and without integrated heat exchangers and electric heating element, FIGS. 8-14 illustrate some of the embodiments of storages of the invention, more specifically:

FIG. 8 with molten salt or oil as heat transfer fluid (HTF) in and out,

FIG. 9 with gas as HTF in and out,

FIG. 10 with molten salt in and super-heated steam out,

FIG. 11 with oil in and super-heated steam out,

FIG. 12 with hot gas in and water/steam out,

FIG. 13 with water/steam in and out, or with oil in and out, and preferably with PCM between elements FIG. 14 with electric heating in and water/steam out, FIG. 15 illustrates construction detail of the housing, FIG. 16 illustrates a housing wall design, FIG. 17 illustrates a further housing wall design, and FIG. 18 illustrates a third housing wall design.

DETAILED DESCRIPTION

Figure 1:
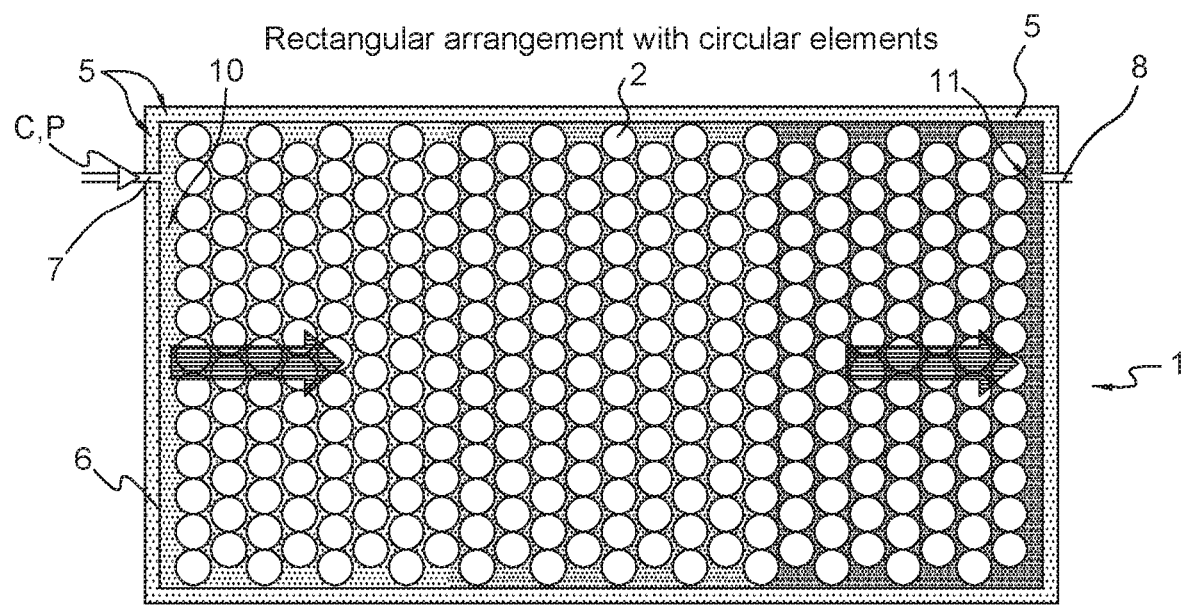
FIG. 1 is a simplified top view cross section of a storage of the invention with dynamic heat transfer fluid and elements with circular cross-section.

Reference is made to FIG. 1, which is a simplified cross section view of a storage of the invention with dynamic fluid as active heat transfer and storage medium and circular concrete thermal energy storage elements.

More specifically, a thermal energy storage and heat exchanger 1 according to the invention is illustrated, comprising many thermal energy storage elements 2, each element with or without an outer shell 3 (refer to FIGS. 7(a)-(c)) being a combined casting form and reinforcement, and a concrete thermal energy storage material 4 inside the optional outer shell. If no outer shell is present, a casting form that after casting must be removed, is used for casting the concrete of the elements. It may also be required to make some type of steel reinforcement within the concrete. The elements are arranged inside a housing 5, a medium 6, such as a thermal oil, molten salt, hot air, hot combustion gas, exhaust gas or flue gas fills the volume between said elements and said housing, for enhanced thermal energy storage and rate of transfer. At least one inlet 7 for energy storage is arranged and at least one outlet 8 for thermal energy, the inlet and outlet are illustrated only with arrows, but can be one or several pipe sockets or similar through the housing wall or roof or similar, as means for delivery or taking out thermal energy from the storage, respectively. The housing comprises thermal insulation 9, inside, outside or in the wall(s), floor and roof of a housing 5, as illustrated clearly in subsequent FIGS. 15-18, and a "hot" chamber 10 and a "cold" chamber 11, for facilitating uniform flow between and around the elements, from the hot side to the cold side. A typical storage of the invention, comprises for example 300 elements arranged side by side in the housing, each element about 0.25 m in diameter and about 10 m long. The number of elements can be hundreds or thousands, and the elements can be horizontally orientated but vertically stacked or piled, for other embodiments of storages of the invention. Smaller or larger elements are also very well feasible. The actual number of elements will depend on the required capacity of the storage, the elements will be in substance identical or similar. The elements may be oriented horizontally or vertically. By turning the illustration 90° clockwise, FIG. 1 also illustrates a storage of the invention with horizontal elements, the elements and the storage being illustrated in cross section, with the storage being in an storage at a high elevation and taken out at a low elevation. For unloading of thermal energy, the direction of flow is preferably reversed.

The figures are simplified and features are out of scale in order to illustrate the issues discussed for each embodiment. For all figures, similar or identical features are given identical numerical reference.

Figure 2:
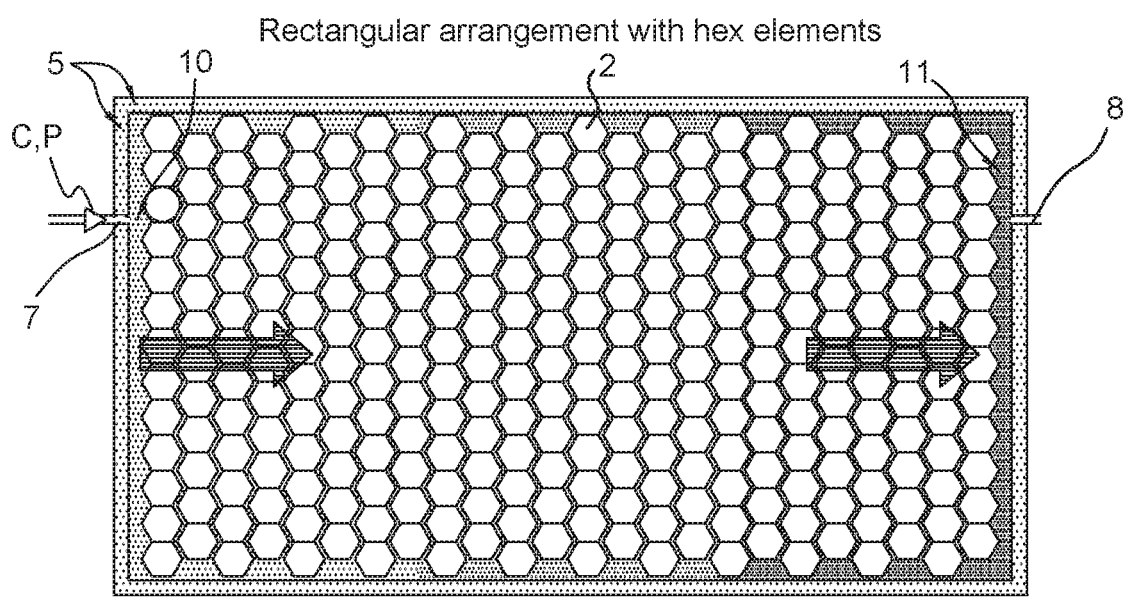
FIG. 2 is a simplified top view cross section of a storage of the invention with dynamic heat transfer fluid and hexagonal elements.

FIG. 2 is similar to FIG. 1, but the elements have hexagonal cross section shape, allowing closer packing and near constant width of space between elements. As for FIG. 1, the elements may be oriented horizontally or vertically. By turning the illustration 90° clockwise, FIG. 2 also illustrates a storage of the invention with horizontal elements, the elements and the storage being illustrated in cross section, with the storage being in an operation mode of loading thermal energy from dynamic fluid brought into the storage at a high elevation and taken out at a low elevation.

Figure 3:
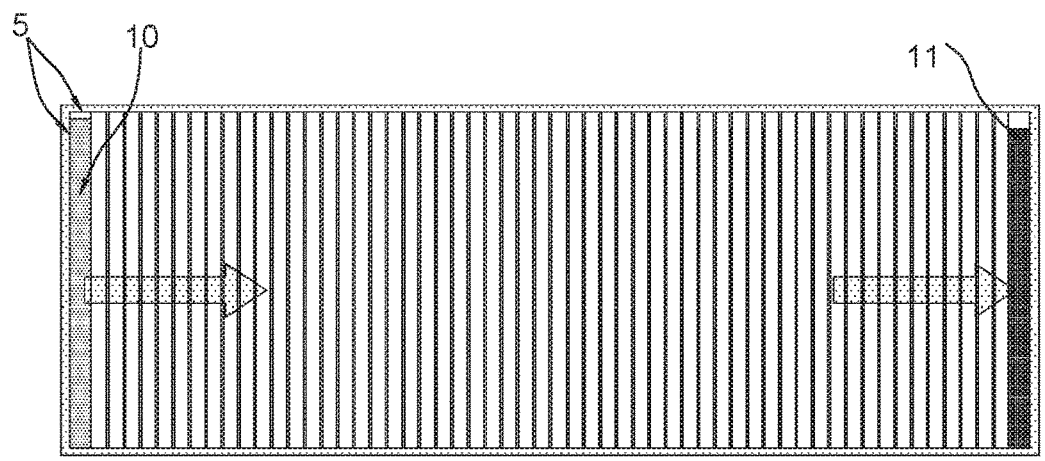
FIG. 3 is a simplified side view longitudinal section of a storage of the invention with dynamic heat transfer fluid on the outside of the elements.

FIG. 3 is a simplified side view longitudinal section of a storage of the invention with dynamic heat transfer fluid, such as the storages of FIG. 1 or 2 viewed from the side. On FIG. 1-3 a hot side chamber 10, toward the inlet 7, and a cold side chamber 11, toward the outlet, are illustrated, the fluid level of the cold chamber is lower than the level of the hot chamber, facilitating gravitational flow of hot medium, in this embodiment for example hot liquid, around and along the elements. In the illustrated situation, the elements of the storage loads thermal energy. In the opposite situation, when unloading thermal energy from the elements, the level of the cold chamber is kept higher than the level of the warm chamber, providing opposite direction of flow. Which side is cold or warm is interchangeable. However, the flow can be provided by one or more of the features: inherent pressure in the source of the medium, a pump (C,P) coupled to or integrated in the inlet 7 and preferably outlet, a compressor, fan or pump (C,P) coupled to or integrated in the inlet 7 and preferably also the outlet, and gravity. For horizontal elements in the storage, the warmer side is preferably always at a higher elevation and the colder side is preferably at a lower elevation, charging discharging is preferably with dynamic fluid flow upwards, whereby dynamic flow and natural convection work in parallel.

FIG. 4 illustrates a further embodiment, with a ring shaped cylindrical housing with circular elements.

FIGS. 5(a)-(d) and 6 illustrate the effect of spacing of elements with circular cross section shape, aligned and staggered, respectively, and hexagonal cross section shape. The letter d denotes half the distance between the elements, so that d=0 represents the situation with closely packed elements without distance between them. For stagnant heat storage liquid or liquid-solid, a small d is relevant and often preferable due to high cost of the fluid. For dynamic heat transfer fluid, which must be able to flow along and around elements d must be sufficiently large to allow for desired flow velocity in relation to pressure differences, fluid viscosity, and surface friction. The cost of heat transfer fluids like molten salts and thermal oils is typically very much higher than the cost for the solid-state elements, typically an order of magnitude higher. Accordingly a volume ratio=volume (solid)/volume (total) in the housing should in general be as high as possible. For stagnant liquid or liquid-solid as heat transfer fluid, or more correctly denoted heat storage fluid since the fluid is stagnant, the packing can be much closer. For a dynamic active heat transfer and storage fluid, a preferable volume ratio exist for predictable operating conditions. More specifically, if fast response for thermal energy storage or delivery is required, such as when the storage deliver energy during the day and store energy during the night on a regular basis, more heat transfer fluid and a lower volume ratio can be preferable than if the regulating cycle has a longer period or frequency. Larger flow rate of heat transfer fluid, by increased flow cross section by having increased distance between elements, will enhance the response or rate for heat input and output.

FIGS. 5(a)-(d)-7(a)-(c)- illustrate the elements 2 in more detail. FIG. 5(a)-(d) also illustrate some of the many alternative cross section shapes of the elements, namely hyper-elliptic. The elements can be with or without heat exchangers 12 (means for heat input and output) or electric heaters 13 (means for heat input), or with one or both of said means, depending on the application, and with or without an outer shell 3. The heat exchanger is not necessarily a small diameter pipe section or pipe bend, or pipe-in-pipe, for lower temperature applications it can be a pipe helix or loop or coil, or plates or pipes having fins or similar shapes for larger surface for heat exchange, since the round shape may not be required to avoid crack formation.

The elements 2 can be arranged vertically standing, side-by-side, as one or more groups of elements in a thermal storage, or horizontally laying and stacked as one or more groups of stacks of elements in a thermal storage. The elements can be arranged in a fixture or template or with intermediate elements for stacking, or the elements can be arranged closely stacked or packed, dependent on the requested performance and integration in existing power plants or systems and available sources for energy. The feature of having an outer metal shell being a combined casting form and reinforcement facilitates cost-efficient, simple, mass production of easily transportable elements and closer stacking or packing. The element preferably contains no further armouring or reinforcement than said outer shell, except of possible fibres or special aggregates in the castable grouting or concrete, and the possible reinforcing effect of imbedded heat exchangers or heaters, which simplifies production and reduces cost. The armouring or reinforcement accordingly consist of the outer metal shell.

For a stagnant active heat transfer and storage medium, which medium most preferably is a phase change material, a round, a hexagonal, rectangular, or quadratic element may be preferable. For a dynamic fluid as active heat transfer and storage medium, the elements are preferably hexagonal, quadratic or rectangular.

storage 1 of the invention.

FIG. 8 illustrates a storage with molten salt as heat transfer fluid (HTF) in and out, useful for a temperature range above molten salt freezing temperature. The purpose of having solid-state heat storage elements is in the tank is to reduce cost by replacing molten salt with cheaper concrete material. Note also that the concept is a "one-tank" thermocline solution where the temperature varies from one side to the other. For being able to melt salt in the tank during start-up and as a safety measure, not illustrated, electric heating devices are arranged in the elements or molten salt or both. The flow velocity of the salt, and hence the rate or response for heat transfer, depends on difference in surface elevation of colder and warmer side, temperature (viscosity) and distance between the elements. This process can in fact be controlled by the rate of filling and out-take of fluid from the tank. For heat discharge or unloading, the direction of flow and the chamber levels are reversed. The storage comprises a means for flow control, such as based on level, pressure or flow rate control. Piping and valves for inlet and outlet, to and from the chambers, are for clarity not illustrated. In addition, the elements can optionally comprise heat exchangers or heaters if found beneficial. In such case the system functions as a thermal storage as well as a heat exchanger between molten salt and the other heat transfer fluid which can be thermal oil or even direct steam. The illustrated embodiment can readily be integrated into existing energy plants based on concentrated solar power (CSP), coal or nuclear power, using molten salt as heat transfer fluid. Alternatively, oil is the HTF in and out, providing a temperature range of operation of above "freezing" to below boiling of the oil. Thus, the practical temperature limit upward is about 400° C., depending on the boiling point of the oil and the pressure capacity of the housing. The boiling point can be increased by increasing pressure, but pressure over about 10 bar is likely to become impractical for larger storages due to the cost of the tank. The lower temperature limit in practice depends on the flow of the oil, as influenced by increasing viscosity at decreasing temperature, chamber surface elevation difference and the packing of the elements. The illustrated embodiment can power (CSP) using oil as heat transfer fluid.

FIG. 9 has similarities with the embodiments of FIG. 8, but with gas as HTF in and out, and the flow velocity of gas is pressure controlled. It can readily be integrated into industrial plants or power plants producing hot gas, such as hot air, exhaust and flue gas, as for certain types of industrial installations or for coal or oil fired plants and bio fuelled plants, and nuclear power plants with hot gas.

FIG. 10 illustrates an embodiment with molten salt in and water/super-heated steam out. The operating temperature range is from above freezing of molten salt, and at least up to the current maximum practical temperature for turbines for generating electricity, that is up to about 620° C. Electric heating means (not illustrated) should be arranged in the storage for melting the salts if required.

This embodiment is also a salt to steam heat exchanger that can be in continuous operation, the ratio between intake (molten salt in) and outtake (water/steam and molten salt out) of heat decides how much energy is stored or delivered at any time. The storage can be integrated into any plant using molten salt as heat transfer and storage medium and super-heated steam for power generation, such as CSP with molten salt and nuclear power with molten salt. Although the physical principle may be the same for the two applications mentioned the purpose of use may be different. A CSP plant will typically use storage for bridging heat production during intermittency (cloud cover, period after sun has gone down) whereas nuclear plant may use the store to attain better flexibility of power production by shifting some of heat generated during the night over to increased power production when in demand during daytime.

FIG. 11 is an embodiment with similarities to FIG. 10, but with oil in and water/super-heated steam out. Accordingly, the operating temperature range is from undue high viscosity to boiling of the oil, the flow of oil depends, in addition to temperature also on the inlet and outlet chamber elevation difference, pressure of the source, connected pumps or not, and the packing of the elements. The oil pressure is preferably at or near atmospheric pressure, for safety and exchanger that can be in continuous operation, the ratio between intake and outtake of heat decides how much energy is stored or delivered at any time. The field of use is CSP with oil or other energy plants with oil as heat transfer fluid.

FIG. 12 illustrates a storage with hot gas/fumes in, and water/steam out, useful for coal or oil or bio fuelled plants, industrial waste heat, or nuclear plants with gas. The operating temperature is preferably above 100° C., preferably at temperatures for pressurized water, superheated steam or supercritical water/steam.

FIG. 13 illustrates a storage with water/steam, or alternatively oil, in and out, and stagnant molten salt or phase change material (PCM) between the elements. The operating temperature range has no practical limit downwards nor upwards, and is preferably far above melting of salt or PCM upwards and below the solidification downwards. Superheated steam or water are feasible for the heat exchangers arranged in the elements. The use of phase change material increases the heat storage capacity of the storage through the high energy content (enthalpy) associated with the phase change. Fields of use are CSP with pressurized water or direct steam, coal-, oil- or bio fuelled plants, industrial waste heat, geothermal plants and nuclear plants with water.

FIG. 14 illustrates an embodiment with electric heating in and water/steam out, and the medium between the cells is molten salt or PCM. The storage comprises electric heaters arranged in the cells or in said medium or both. Fields of use are wind power plants, photovoltaic based solar plants, electric grids as energy source in periods of low cost, and any other source of electric power. The operating temperature range is virtually unlimited, due to electric heating input. Upwards, the practical limit is set by the maximum operating temperature-pressure combination of connected steam turbines rather than the limits for pipe heat exchangers or concrete or salt or PCM in the storage. At for the storage.

FIG. 15 illustrates a principle of reinforcing the housing of large storages, feasible for oil and molten salts as medium or containment fluid. Tensioned tie bars or plates can allow larger storages with higher pressure, without undue increase of housing wall, roof or bottom thickness.

FIGS. 16-18 illustrate different housing wall designs, feasible for storages of the invention. FIG. 18 illustrates a high temperature wall, for molten salt, molten metal or high temperature gas, comprising an inside metal lining 14, a firebrick layer, insulation 9 and a reinforced concrete wall, from inside to outside. The wall design on FIG. 16 comprises horizontal stiffeners 17.

The housings can be constructed and built using good engineering practice of persons skilled in the art. The inner metal lining can be built as described in international patent publication WO 2006046874.

Some preferable embodiments of storages of the invention are illustrated and described above. However, features can be combined in other ways, and the advantages or limitations as set forth for specific features will in general be valid also for other embodiments than those exemplified and discussed specifically. The storage of the invention can include any feature as described or illustrated, in any operative combination, and each such operative combination is an embodiment of the invention.

For example, a preferable embodiment of a thermal energy storage and heat exchanger of the invention comprises:
- a number of hardened concrete thermal energy storage elements;
- a housing, into which said elements have been arranged;
- at least one means for delivery of thermal energy to the thermal energy storage;
- at least one means for taking out thermal energy from the thermal energy thermal insulation, and
- an active heat transfer and storage medium in the volume between said elements and said housing, in the form of either:
  - a stagnant liquid or phase change material, wherein the storage comprises a heat exchanger embedded in some or all of the thermal energy storage elements as means for taking thermal energy in or out from the storage, or a dynamic fluid arranged to flow in the volume between said elements and said housing, wherein the storage comprises at least one inlet for said dynamic fluid to the housing, and at least one outlet for said dynamic fluid from the housing The storage of the invention provides increased storage capacity and response (rate for heat input and output) at a lower cost than comparable prior art storages. In addition, the storage of the invention allows an increased dynamic temperature range and increased versatility with respect to field of use.

The invention claimed is:

1. A thermal energy storage and heat exchanger comprising:
   a plurality of concrete thermal energy storage elements;
   an insulated housing, wherein the insulated housing comprises thermal insulation in at least one of an inside, an outside, a wall, a floor and a roof of the insulated housing;
   a heat transfer and storage medium;
   wherein the plurality of concrete thermal energy storage elements are arranged inside the insulated housing;
   wherein at least one of the plurality of concrete thermal energy storage elements comprises a pipe heat exchanger embedded in the element, the pipe heat exchangers comprising an inlet and outlet extending out from one side of the element inside the insulated housing of the thermal energy storage, the pipe heat exchanger further comprising a structure embedded in the concrete of the element reversing a direction of flow from an inlet direction to an opposite outlet direction, wherein the pipe heat exchanger, for a full distance from the inlet to the outlet extending out from one side of the element inside the insulated housing of the thermal energy storage, is fully embedded in the concrete;
   wherein the heat transfer and storage medium fills a volume between the plurality of concrete thermal energy storage elements and the insulated housing in a form of a stagnant medium selected from the group consisting of thermal oil, molten salt, molten metal and phase change material;
   at least one inlet to the thermal energy storage coupled to an inlet of the elements inside the insulated housing of the thermal energy storage; and
   at least one outlet from the thermal energy storage coupled to an outlet of the elements inside the insulated housing of the thermal energy storage.

2. The thermal energy storage and heat exchanger according to claim 1, wherein:
   the plurality of concrete thermal energy storage elements in a storage is 2, 5, 10, 40, 100, 200 or 500 and above, and any integer in between; and
   the plurality of concrete thermal energy storage elements are arranged vertically standing, side-by-side or horizontally laying and stacked, as at least one groups of stacks of elements in the thermal energy storage.

3. The thermal energy storage and heat exchanger according to claim 1, wherein the plurality of concrete thermal energy storage elements comprise an outer metal shell, wherein the outer metal shell functions as a combined casting form, reinforcement, protective shell and fluid leakage retainer shell.

4. The thermal energy storage and heat exchanger according to claim 1, wherein the pipe heat exchangers have a pipe dimension to ensure turbulent flow at normal operating conditions.

5. The thermal energy storage and heat exchanger according to claim 1, wherein the at least one inlet to the plurality of concrete thermal energy storage elements is an opening for filling the stagnant medium.

6. A thermal energy storage and heat exchanger comprising:
   a plurality of concrete thermal energy storage elements;
   an insulated housing, wherein the insulated housing comprises thermal insulation in at least one of an inside, an outside, a wall, a floor and a roof of the insulated housing;
   a heat transfer and storage medium;
   wherein the plurality of concrete thermal energy storage elements are arranged inside the insulated housing;
   wherein at least one of the plurality of concrete thermal energy storage elements comprises a pipe heat exchanger embedded in the element, the pipe heat exchangers comprising an inlet and outlet extending out from one side of the element inside the insulated housing of the thermal energy storage, the pipe heat exchanger further comprising a structure embedded in the concrete of the element reversing a direction of flow from an inlet direction to an opposite outlet direction, wherein the pipe heat exchanger, for a full distance from the inlet to the outlet extending out from one side of the element inside the insulated housing of the thermal energy storage, is fully embedded in the concrete;
   wherein the heat transfer and storage medium fills a volume between the plurality of concrete thermal energy storage elements and the insulated housing in a form of a dynamic medium selected from the group consisting of thermal oil, exhaust gas, flue gas, combustion gas, inert gas, molten salt, and molten metal, arranged to flow in the volume between the plurality of concrete thermal energy storage elements and the insulated housing;
   at least one inlet to the thermal energy storage coupled to an inlet of the elements inside the insulated housing of the thermal energy storage; and
   at least one outlet from the thermal energy storage coupled to an outlet of the elements inside the insulated housing of the thermal energy storage.

7. The thermal energy storage and heat exchanger according to claim 6, wherein:
   the plurality of concrete thermal energy storage elements in a storage is 2, 5, 10, 40, 100, 200 or 500 and above, and any integer in between; and
   the plurality of concrete thermal energy storage elements are arranged vertically standing, side-by-side or horizontally laying and stacked, as at least one groups of stacks of elements in the thermal energy storage.

8. The thermal energy storage and heat exchanger according to claim 6, wherein the plurality of concrete thermal energy storage elements comprise an outer metal shell, wherein the outer metal shell functions as a combined casting form, reinforcement, protective shell and fluid leakage retainer shell.

9. The thermal energy storage and heat exchanger according to claim 6, wherein the pipe heat exchangers have a pipe dimension to ensure turbulent flow.

10. The thermal energy storage and heat exchanger according to claim 6, wherein the at least one inlet for the plurality of concrete thermal energy storage elements is an opening through a wall of the housing at a high elevation of the thermal energy storage, as an inlet for the dynamic medium, the inlet comprising a pump or a compressor for flow of the dynamic medium.

11. The thermal energy storage and heat exchanger according to claim 6, wherein the plurality of concrete thermal energy storage elements are arranged with a cross section area for flow around and between the plurality of concrete thermal energy storage elements at least as large as a cross section area of flow of the at least one inlet to and the at least one outlet from the housing.

* * * * *